United States Patent [19]

Hockemeyer et al.

[11] 4,184,006

[45] Jan. 15, 1980

[54] PROCESS FOR PREPARING ADHESIVE REPELLENT COATINGS AND COATED ARTICLE

[75] Inventors: Friedrich Hockemeyer, Emmerting; Peter August, Burghausen, both of Fed. Rep. of Germany

[73] Assignee: Wacker-Chemie GmbH, Munich, Fed. Rep. of Germany

[21] Appl. No.: 851,036

[22] Filed: Nov. 14, 1977

[30] Foreign Application Priority Data

Dec. 3, 1976 [DE] Fed. Rep. of Germany ....... 2654893

[51] Int. Cl.$^2$ ............................................... B32B 9/04
[52] U.S. Cl. .................. 428/447; 427/372 R; 427/387; 427/395; 428/452
[58] Field of Search .................. 427/387, 372 R, 395; 428/452, 447

[56] References Cited

FOREIGN PATENT DOCUMENTS 2210380 of 0000 Fed. Rep. of Germany .
2427738 of 0000 Fed. Rep. of Germany .

*Primary Examiner*—Bernard D. Pianalto

[57] ABSTRACT

A process for preparing adhesive repellent coatings which comprises applying to the surface to be rendered adhesive repellent a mixture containing (1) a diorganopolysiloxane having an Si-bonded vinyl group in each of the terminal units, but is otherwise free of aliphatic unsaturation, (2) an organopolysiloxane having at least 3 Si-bonded hydrogen atoms per molecule, (3) a vinylsiloxane platinum complex and (4) an organic or organosilicon compound which retards or delays the addition of Si-bonded hydrogen to aliphatic multiple bonds, said compound has a boiling point of at least 25° C. at 760 mm Hg (absolute) and at least one aliphatic triple bond, and thereafter crosslinking the diorganopolysiloxane (1).

8 Claims, No Drawings

PROCESS FOR PREPARING ADHESIVE REPELLENT COATINGS AND COATED ARTICLE

BACKGROUND OF THE INVENTION

The present invention relates to an adhesive repellent coating and more particularly to a process for rendering surfaces adhesive repellent.

Adhesive repellent coatings obtained from compositions consisting of (1) a diorganopolysiloxane having terminal Si-bonded vinyl groups, but is otherwise free of aliphatic unsaturation, (2) a diorganopolysiloxane having at least 3 Si-bonded hydrogen atoms per molecule, (3) a vinylsiloxane platinum complex and (4) a compound which retards the addition of Si-bonded hydrogen to aliphatic multiple bond at room temperature have been described in German patent application DT-OS-No. 2,210,380.

Compared to the compositions described in German patent application No. DT-OS No. 2,210,380, the four (4) component compositions of the present invention are more stable, i.e., they have a longer "pot life", but they crosslink very rapidly at the crosslinking temperatures generally employed. Moreover, even 24 hours after their preparation, these compositions provide coatings which exhibit substantially the same adhesive repellency as freshly prepared compositions.

Also, German patent application No. DT-OS No. 2,427,738 describes coatings which are obtained from mixtures substantially free of solvents containing (1) a diorganopolysiloxane having terminal Si-bonded vinyl groups, but is otherwise free of aliphatic unsaturation, (2) an organopolysiloxane having at least 3 Si-bonded hydrogen atoms per molecule, (3) a platinum complex and (4) an organic compound which delays the addition of Si-bonded hydrogen to aliphatic multiple bonds at room temperature, in which the organic compound has a boiling point of at least 25° C. at 760 mm Hg (absolute) and at least one aliphatic triple bond, such as 2-methyl-2-hydroxybutin-1-ol.

In contrast to the coatings described in German patent application No. DT-OS No. 2,427,738, the coatings of the present invention exhibit improved mechanical strength without having to employ organosiloxanes which contain an Si-bonded hydrogen in each of the terminal units and a methylvinylpolysiloxane having at least 3 Si-bonded vinyl groups per molecule [components (b) and (c) respectively of German patent application No. DT-OS No. 2,427,738]. Thus, the present invention provides coatings having improved mechanical strength without having to add organosiloxanes having terminal Si-bonded hydrogen atoms or methylvinylpolysiloxanes having at least 3 Si-bonded vinyl groups per molecule.

Therefore, it is an object of this invention to provide adhesive repellent coatings which exhibit improved mechanical strength. Another object of this invention is to provide compositions which can be crosslinked to form adhesive repellent coatings. Still another object of this invention is to form compositions which have a longer "pot life", but crosslink rapidly to form adhesive repellent coatings. A further object of this invention is to provide a process for preparing adhesive repellent coatings.

SUMMARY OF THE INVENTION

The foregoing objects and others which will be apparent from the following description are accomplished in accordance with this invention, generally speaking, by providing an adhesive repellent coating which comprises applying to a surface to be rendered adhesive repellent a mixture consisting essentially of (1) a diorganopolysiloxane having terminal Si-bonded vinyl groups, but is otherwise free of aliphatic multiple bonds, (2) an organopolysiloxane having at least 3 Si-bonded hydrogen atoms per molecule, (3) a vinylsiloxane platinum complex, and (4) an organic or organosilicon compound which retards the addition of Si-bonded hydrogen to aliphatic multiple bonds at room temperature in which the organic or organosilicon compound has a boiling point of at least 25° C. at 760 mm Hg (absolute) and contains at least one aliphatic triple bond.

DETAILED DESCRIPTION OF THE INVENTION

The diorganopolysiloxanes (1) having terminal Si-bonded vinyl groups which are otherwise free of aliphatic multiple bonds are preferably those having the general formula:

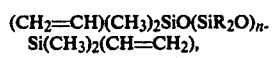
$$(CH_2=CH)(CH_3)_2SiO(SiR_2O)_n\text{-}Si(CH_3)_2(CH=CH_2),$$

where R represents the same or different, monovalent hydrocarbon radicals and substituted monovalent hydrocarbon radicals which are free of aliphatic unsaturation, and n is a number whose value is such that the diorganopolysiloxanes have a viscosity of 40 to 100,000 cP at 25° C.

The diorganopolysiloxanes represented above may contain siloxane units other than the diorganosiloxane units, i.e., units of the general formula $SiR_2O$, along or within the chain. Examples of such other siloxane units which are generally present only as impurities are those corresponding to the following formulas:

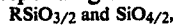
$$RSiO_{3/2} \text{ and } SiO_{4/2},$$

where R is the same as above. It is preferred that such other siloxane units be present in an amount less than about 10 mol percent and more preferably less than about 1 mol percent.

Examples of SiC-bonded hydrocarbon radicals other than vinyl groups which are represented by R in the diorganopolysiloxanes (1) above are alkyl radicals having from 1 to 18 carbon atoms such as the methyl, ethyl, n-propyl, isopropyl, n-butyl and the sec-butyl radical, as well as the octadecyl radicals; cycloalkyl radicals having from 5 to 18 carbon atoms, for example the cyclohexyl and the cycloheptyl radical as well as the methylcyclohexyl radical; aryl radicals, such as the phenyl radical and xenyl radicals; alkaryl radicals, such as tolyl radicals; and aralkyl radicals, such as the benzyl and the beta-phenyl-ethyl radicals.

Examples of SiC-bonded, substituted hydrocarbon radicals represented by R, which may be present on the diorganopolysiloxanes (1) are halogenated hydrocarbon radicals which are free of aliphatic multiple bonds, such as the 3,3,3-trifluoropropyl radical and o,p- and m-chlorophenyl radicals.

It is preferred that at least 50 percent and more preferably at least 90 percent of the SiC-bonded organic radicals represented by R in the diorganopolysiloxanes (1) above be methyl radicals since they are more readily available.

The diorganopolysiloxanes (1) can be copolymers or mixtures comprising various copolymers having an identical degree of polymerization or mixtures consisting of identical or different polymers having various degrees of polymerization. When the diorganopolysiloxanes (1) contain various diorganopolysiloxane units, then said various units may be randomly distributed or they may be present in the form of block polymers.

When it is desired to obtained a relatively high degree of adhesive repellency with readily available diorganopolysiloxanes (1), for example the manufacture of food packaging, it is preferred that all SiC-bonded organic radicals other than the vinyl group in the diorganopolysiloxanes (1) be methyl radicals. Conversely, when one wishes to obtain a lower degree of adhesive repellency, for example for the manufacture of backings for self-adhesive labels, then it is preferred that 3 to 30 mol percent and more preferably 5 to 20 mol persent of the diorganosiloxane units in the diorganopolysiloxanes (1) be diphenylsiloxane units, while at least 50 percent of the number of hydrocarbon radicals in the remaining diorganopolysiloxane units of the diorganopolysiloxanes (1) are methyl groups. Adhesive repellency decreases as the proportion of diphenylsiloxane units is increased.

It is preferred that the viscosity of the diorganopolysiloxanes (1) be from 40 to 10,000 cP at 25° C., and more preferably from 50 to 50,000 cP at 25° C.

The organosiloxanes (2) which have at least 3 Si-bonded hydrogen atoms per molecule, may be the same organopolysiloxanes having at least 3 Si-bonded hydrogen atoms per molecule as have been employed heretofore in the preparation of adhesive repellent coatings from compositions containing diorganopolysiloxanes having terminal Si-bonded vinyl groups, organopolysiloxanes having at least 3 Si-bonded hydrogen atoms per molecule and catalysts which promote the addition of Si-bonded hydrogen to vinyl groups.

In the organopolysiloxanes (2) which contain at least 3 Si-bonded hydrogen atoms per molecule it is preferred that the silicon valences which are not saturated with hydrogen atoms and siloxane oxygen atoms, be saturated with methyl, ethyl and/or phenyl radicals. These organopolysiloxanes (2) are preferably represented by the general formula:

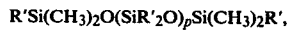

$$R'Si(CH_3)_2O(SiR'_2O)_pSi(CH_3)_2R',$$

where R' represents hydrogen or the methyl, ethyl and/or phenyl radical, with the provision that only one hydrogen atom may be bonded to an Si atom, and that on the average at least 0.2 Si-bonded hydrogen atoms be present for each SiR'$_2$O-unit. Of course at least 3 Si-bonded hydrogen atoms are present for each molecule and p is a number whose value is such that the viscosity of the organopolysiloxanes (2) is from 4 to 130 cP.

It is preferred that the Si-bonded hydrogen atoms be present in an amount of from 0.2 to 1.6 percent by weight and more preferably, from 1.0 to 1.46 percent by weight based on the weight of the organopolysiloxanes (2).

Examples of organopolysiloxanes (2) having the above formula are copolymers containing dimethylhydrogensiloxane, methylhydrogensiloxane, dimethylsiloxane and trimethylsiloxane units; copolymers containing trimethylsiloxane, dimethylhydrogensiloxane and methylhydrogensiloxane units; copolymers containing trimethylsiloxane, dimethylsiloxane and methylhydrogensiloxane units; copolymers containing methylhydrogensiloxane and trimethylsiloxane units; copolymers containing methylhydrogensiloxane, diphenylsiloxane and trimethylsiloxane units; copolymers containing methylhydrogensiloxane, dimethylhydrogensiloxane, and diphenylsiloxane units; copolymers of methylhydrogensiloxane, phenylmethylsiloxane. trimethylsiloxane and/or dimethylhydrogensiloxane units; copolymers of methylhydrogensiloxane, dimethylsiloxane, diphenylsiloxane, trimethylsiloxane and/or dimethylhydrogensiloxane units; as well as copolymers of dimethylhydrogensiloxane, trimethylsiloxane, phenylhydrogensiloxane, dimethylsiloxane and/or phenylmethylsiloxane units.

It is preferred however that all silicon valences in the organopolysiloxanes (2) which are not saturated with hydrogen and siloxane oxygen atoms be saturated with methyl radicals. Thus, in the above formula which represents organopolysiloxanes (2), R' represents either hydrogen or methyl radicals.

Mixtures containing various organopolysiloxanes (2) may also be employed, However, it is equally possible to use only one type of the organopolysiloxane (2).

The organopolysiloxanes (2) are preferably used in an amount of from 0.5 to 3 gram-equivalent Si-bonded hydrogen for each gram/mol of Si-bonded vinyl groups present in the diorganopolysiloxanes (1).

The diorganopolysiloxanes (1) and the organopolysiloxanes (2), including the preferred type of organopolysiloxanes (2), are generally known and may be prepared by any conventional process known in the art.

The vinylsiloxane platinum complex (3) may contain or may be free of detectable inorganic halogen. In other words, it can for example be a chlorine-containing reaction product of chloroplatinic acid and 1,3-divinyl-1,1,3,3-tetramethyldisiloxane. The preparation of such a reaction product is described in U.S. Pat. No. 3,419,593, to Willing. A halogen-containing vinylsiloxane platinum complex can also be prepared by mixing 0.2 gm of PtCl$_4$ in 5 ml of anhydrous ethanol with 113.6 gm of a dimethylpolysiloxane which has vinyldimethylsiloxane units as terminal units and which has a viscosity of 1100 cP at 23° C., and thereafter distilled at 30° C. and at 0.2 mm Hg (absolute) to remove the ethanol. It is preferred that the vinylsiloxane platinum complexes be free of halogen. These complexes can be obtained from the reaction of chloroplatinic acid with 1,3-divinyl-1,1,3,3-tetramethyldisiloxane from which the halogen has been removed during or after the reaction. Vinylsiloxane platinum complexes which are free of halogen and which are thus preferred for the purposes of this invention are described in U.S. Pat. No. 3,715,334, to Karstedt.

It is preferred that the vinylsiloxane platinum complex (3) be employed in an amount of from 1 to 100 parts by weight per million parts by weight and more preferably from 40 to 60 parts by weight per million parts by weight calculated as Pt and based on the total weight of the organosilicon compounds.

The compounds (4) which are employed to retard or delay the addition of Si-bonded hydrogen to aliphatic multiple bonds at room temperature are preferably organic or organosilicon compounds which have a boiling point of at least 25° C. at 760 mm Hg (absolute) and have at least one aliphatic triple bond and are free of nitrogen and phosphorous atoms as well as carbonyl groups which are in an alpha position in relation to a carbon atom from which an aliphatic triple bond originates, as well as mercapto and carboxyl groups.

Examples of preferred compounds (4) are 2-methyl-3-butine-2-ol and ethinylcyclohexanol, as well as butine-2, 2-methyl-but-1-en-3-in [$CH_2{\equiv}C(CH_3)C{=}CH_3$], phenylacetylene, phenyltris-(propin(1)-yloxy)-silane, 2,5-dimethyl-3-hexine-2,5-diol and 3,5-dimethyl-1-hexine-3-ol.

Organic or organosilicon compounds having a boiling point of at least 25° C. at 760 mm Hg (absolute) and having at least one aliphatic triple bond are already known to retard or delay the addition of Si-bonded hydrogen to aliphatic multiple bonds. These compounds are described in for example British Pat. No. 1,141,868 and French Pat. No. 1,528,464.

The organic or organosilicon compounds having a boiling point of at least 25° C. at 760 mm Hg (absolute) and at least one aliphatic triple bond which retard or delay the addition of Si-bonded hydrogen to aliphatic multiple bonds at room temperature are preferably used in an amount of at least 2 mol —C≡C— per gram/atom of platinum. It is preferred that these compounds be present in an amount of from 0.1 to 0.8 percent by weight based on the total weight of the oganosilicon compounds used.

The coating composition consists of a mixture containing at least 98 percent by weight of (1) a diorganopolysiloxane having at least one Si-bonded vinyl group in its terminal units and which is otherwise free of aliphatic multiple bonds, (2) an organopolysiloxane having at least 3 Si-bonded hydrogen atoms per molecule, (3) a vinylsiloxane platinum complex and (4) an organic or organosilicon compound having a boiling point of at least 25° C. at 760 mm Hg (absolute) and at least one aliphatic triple bond. Thus, the mixture is substantially free of water and solvent except for the solvent which may be present as a diluent in the platinum complex.

The sequence of mixing components (1) (2) (3) and (4) is not critical; however, it is preferred that component (2), i.e. the organopolysiloxane containing at least 3 Si-bonded hydrogen atoms, be added to the mixture containing components (1), (3) and (4).

The adhesive repellent compositions which consist essentially of (1) a diorganopolysiloxane having terminal Si-bonded vinyl groups and which is otherwise free of aliphatic multiple bonds, (2) an organopolysiloxane having at least 3 Si-bonded hydrogen atoms per molecule, (3) a vinylsiloxane platinum complex and (4) an organic or organosilicon compound having a boiling point of at least 25° C. at 760 mm Hg (absolute) and at least one aliphatic triple bond, can be applied to surfaces to be rendered adhesive repellent by any technique known in the art for applying liquid compositions to solid surfaces. For example, the composition may be applied by immersion, coating, pouring, rinsing, rollering, printing, for example by means of an offset coating device, laid or tabled coating, as well as with a Meyer-Rod or an airbrush. When the coating is applied by means of an offset application device, for example with a screen-roller system, the surface to be coated with the adhesive repellent may travel at a higher rate of speed than the form cylinder.

The surfaces which are to be rendered adhesive repellent in accordance with the process of this invention may be any surface which is solid at room temperature and at 760 mm Hg (absolute). Examples of such surfaces are those of paper, wood, cork, plastic film, woven or non-woven fabric of natural or synthetic fibers, ceramic, glass, metals, polyethylene-coated paper and board, including asbestos. The paper may consist of low-grade types of paper, absorbent paper, including raw paper, i.e., Kraft paper which has not been pretreated with chemical and/or polymer substances and which has a weight of 60 to 150 gm/m$^2$, non-sized paper, low-freeness paper, wood-containing paper, non-satinated or noncalendered paper, paper which is smooth on only one side and which is therefore referred to as "one-side machine smoothed paper", as well as uncoated paper and recycled paper. The adhesive repellent compositions of this invention may be applied as a coating to high-grade paper, such as non-absorbent paper, sized paper, high-freeness paper, wood-free paper, calendered or satinated paper, parchment type paper or coated paper and cardboard.

The organopolysiloxanes (1) can be crosslinked in the same manner as adhesive repellent coating compositions prepared heretofore from diorganopolysiloxanes having Si-bonded vinyl groups in their terminal units, an organopolysiloxane having at least 3 Si-bonded vinyl groups, and a catalyst which promotes the addition of Si-bonded hydrogen to vinyl groups. These compositions may be crosslinked by heating to at least 80° C., for example in an oven or a heated chamber or on a heated roller or plate. In order to avoid any damage to the adhesive repellent coating, temperatures in excess of 250° C. should be avoided. Temperatures of from about 100° to 220° C. are preferred. Generally a period of time of from 3 to 180 seconds is sufficient to achieve complete crosslinking.

The process of this invention may be used to manufacture separating paper, felted paper and paper used in the manufacture of decorating films and foam plastics. Also the process may be employed in the preparation of separating felted and cover films and cloths; for the manufacture of self-adhesive strips or self-adhesive films or the printed side of self-adhesive labels. Furthermore, the process can be employed to manufacture packaging materials made of paper, cardboard, metal foils and fibers, plastics, wood or iron when the packaging material is to be used for the storage or transportation of sticky materials such as food, for example, cake, honey, candy and meat, adhesive materials, bitumem, asphalt, greased metallic components and raw rubber. The process can be used for example in the coating of carriers for the transfer of adhesive substances such as the so-called "transfer process".

In the following examples all parts and percentages are by weight unless otherwise specified.

A vinylsiloxane platinum complex and diluent which is used in the following examples is prepared in the following manner:

To a mixture containing 10 parts of $H_2PtCl_6.6H_2O$, 20 parts of 1,3,divinyl-1,1,3,3-tetremethyldisiloxane and 50 parts of ethanol, are added 20 parts of sodium bicarbonate. The mixture is heated for 30 minutes to the boiling point under reflux, with constant agitation, allowed to stand for 15 hours and then filtered. The volatile components are removed from the filtrate by distillation at approximately 12 mm Hg (absolute). The residue consists of about 17 parts of a liquid which is miscible in benzene. The solution is filtered and the benzene distilled off the filtrate. The residue is mixed with a dilutant consisting of a dimethylpolysiloxane having terminal vinyldimethylsiloxane units and a viscosity of 1400 cP at 23° C., in an amount such that the resultant mixture contains 1 percent by weight of platinum, calculated as elemental platinum.

EXAMPLE 1

One hundred (100) parts of a dimethylpolysiloxane having vinyldimethylsiloxane terminal units and a viscosity of 270 cP at 25° C. are first mixed with 0.25 part of 2-methyl-3-butine-2-ol and then with 0.25 part of a mixture containing the vinylsiloxane platinum complex and diluent whose preparation was described above and then with 2 parts of a copolymer having a viscosity of 50 cP at 25° C. and consisting of 4 mol percent of trimethylsiloxane, 72 mol percent of methylhydrogensiloxane and 24 mol percent of dimethylsiloxane units and contains 0.36 percent of Si-bonded hydrogen. Following the timespan shown in Table 1, the mixture thus obtained is applied with the aid of a glass rod to non-absorbent paper at the rate of approximately 6 to 8 gm/m$^2$. The coated paper is placed in a circulating air oven which is heated first to 120° C. and later to 150° C. to crosslink the dimethylsiloxane. When the coating mixture is applied within 6 hours after its preparation, it is dry to the extent that it cannot be rubbed off after heating to 120° C. for 20 seconds, whereas when heated to 150° C. it resists rubbing after only 10 seconds. However, when the coating is applied 24 hours after its preparation, it resists rubbing after 25 seconds when heated to 120° C. and when heated to 150° C., the coating is resistant to rubbing within 12 seconds after application.

A 2 cm wide pressure sensitive adhesive band ("Tesafilm" manufactured by Beiersdorf AG, Hamburg, West Germany, a registered trademark) is placed on the coated paper and pressed down with the aid of a rubber roller at the rate of 15 kg/cm$^2$. After heating to 70° C., the adhesive band is stripped off at an angle of 180° at a speed of 30 cm/minute. The force required to remove the adhesive band is then measured. In the following table the force required is referred to as "Separation Force". The residual adhesiveness refers to the adhesiveness of the band before being pressed onto the coated paper, with the original adhesiveness being defined as 100 percent.

TABLE 1

| Elapsed time between preparation of mixture and application to paper hours | Separation Force P/cm | Residual Adhesiveness Percent |
|---|---|---|
| 0 | 2 | 100 |
| 1 | 3 | 89 |
| 2 | 3 | 83 |
| 3 | 2 | 88 |
| 4 | 2 | 93 |
| 5 | 3 | 89 |
| 6 | 3 | 98 |
| 24 | 1 | 86 |

EXAMPLE 2

(a) One hundred (100) parts of a dimethylpolysiloxane having vinyldimethylsiloxane terminal units and a viscosity of 560 cP at 25° C. are mixed, first with 0.3 part of molten ethinylcyclohexanol, then with 0.4 part of the mixture containing the vinylsiloxane platinum complex and diluent whose preparation has been described heretofore, and finally with 3 parts of the organopolysiloxane having Si-bonded hydrogen which was described in Example 1. About 250 gm of the mixture thus prepared are recycled with the aid of a pump having a capcity of approximately 60 liters per hour. After 1 hour the viscosity of the mixture is measured at 25° C. and the time required to achieve crosslinking at a temperature of 150° C. in an air circulating oven, i.e., to achieve a rubbing-resistant coating which is applied to satinated paper with a glass rod at the rate of approximately 8 gm/m$^2$, is determined. The results are shown in Table 2.

TABLE 2

| Pumping time, hours | Number of times mixture has circulated through pump | Viscosity cP | Crosslinking time at 150° C., seconds |
|---|---|---|---|
| 0 | 0 | 554.4 | 8 |
| 1 | 240 mal | 545 | 8 |
| 2 | 480 mal | 582 | 8 |
| 3 | 720 mal | 566 | 8 |
| 4 | 960 mal | 583 | 8 |
| 5 | 1200 mal | 593 | 8 |
| 6 | 1440 mal | 598 | 8 |
| 7 | 1680 mal | 602 | 8 |

The above results show that prior to crosslinking, the mixtures of this invention are very stable, even under high mechanical stress.

(b) The mixture prepared in accordance with Example 2(a) is applied with an offset process in a continuous roller system to non-absorbent paper having a high degree of surface smoothness, at the rate of 1.0 to 1.4 gm/m$^2$, and then crosslinked in a drying oven at the temperatures indicated in the following table. The Separation Force and Residual Adhesiveness factors are determined in accordance with the procedure of Example 1.

| Crosslinking Temperature °C. | Time Required for Crosslinking in Seconds | Separation Force p/cm | Residual Adhesiveness Percent |
|---|---|---|---|
| 100 | 60 | 2 | 93 |
| 110 | 40 | 2 | 95 |
| 120 | 16 | 2 | 98 |
| 130 | 13.7 | 2 | 90 |
| 140 | 10.6 | 1 | 98 |
| 150 | 8 | 1 | 95 |
| 160 | 6 | 1 | 86 |
| 180 | 4.2 | 2 | 78 |
| 200 | 3.2 | 2 | 80 |

EXAMPLE 3

The process of Example 1 is repeated, except that polyethylene coated, specifically 67 gm/m$^2$ imitation parchment paper is substituted for the non-absorbent paper. The coating on the smooth surface resists rubbing, i.e., it has high mechanical strength, even though it does not contain an organopolysiloxane having terminal Si-bonded hydrogen atoms nor a methylvinylpolysiloxane having at least 3 Si-bonded vinyl groups per molecule. The following table shows the Separation Force and Residual Adhesiveness of the coating when tested in accordance with the procedure of Example 1:

| | Separation Force p/cm | Residual Adhesiveness Percent |
|---|---|---|
| Polyethylene coated paper | 6 | 80 |
| Imitation parchment paper | 9 | 85 |

What is claimed is:

1. A process for the preparation of adhesive repellent coatings which comprises applying to a surface to be rendered adhesive repellent a mixture consisting essentially of (1) a diorganopolysiloxane having terminal Si-bonded vinyl groups, but is otherwise free of aliphatic multiple bonds, (2) an organopolysiloxane having at least 3 Si-bonded hydrogen atoms per molecule, (3) a vinylsiloxane platinum complex which is essentially free of halogen, and (4) a compound which retards the addition of Si-bonded hydrogen to aliphatic multiple bonds at room temperature, said compound is selected from the class consisting of an organic compound and an organosilicon compound having a boiling point of at least 25° C. at 760 mm Hg (absolute) and at least one aliphatic triple bond and thereafter crosslinking the diorganopolysiloxane (1).

2. The process of claim 1, wherein the compound (4) is an organic compound.

3. The process of claim 2, wherein the organic compound (4) is 2-methyl-3-butine-2-ol.

4. The process of claim 2, wherein the organic compound (4) is ethinylcyclohexanol.

5. The process of claim 1, wherein the compound (4) is an organosilicon compound.

6. The process of claim 1, wherein the compound (4) is present in an amount of from 0.1 to 0.8 percent by weight based on the total weight of the organosilicon compounds.

7. The process of claim 1, wherein the coated surface is heated to a temperature of at least 80° C. to crosslink diorganopolysiloxane (1).

8. A paper surface treated in accordance with the process of claim 1.